UNITED STATES PATENT OFFICE 2,396,292

ACETYLATION OF HYDROXY NITRILES

Ober C. Slotterbeck, Clark Township, Union County, N. J., assignor to Standard Oil Development Company, a corporation of Delaware No Drawing. Application December 28, 1943, Serial No. 515,983

9 Claims. (Cl. 260—464)

The present invention relates to improved methods for the production of esters of alpha hydroxy alkyl cyanides. More particularly, the invention is concerned with a method whereby alpha hydroxy alkyl cyanides are esterified directly with an organic carboxylic acid.

The preparation of alpha hydroxy alkyl cyanide esters or cyanohydrin esters by reacting the hydroxy radical with the anhydride of the acid by means of heat in the presence of a trace of mineral acid as a catalyst is known and may be illustrated by the following equation wherein lactonitrile is reacted with acetic anhydride to form lactonitrile acetate and acetic acid as follows—

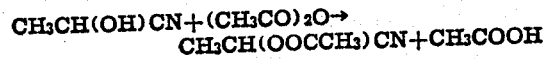

CH₃CH(OH)CN + (CH₃CO)₂O →
   CH₃CH(OOCCH₃)CN + CH₃COOH

This type of reaction is of interest for the reason that the esters through pyrolysis may be converted to the vinyl nitriles which are intermediates in synthetic rubber production. For example, when lactonitrile acetate is heated to 400°–500° C. it is converted into acrylonitrile and acetic acid. Utilizing the illustrated series of steps, lactonitrile, which cannot be dehydrated directly to acrylonitrile, may be converted to vinyl nitrile. The principal difficulty with the foregoing process is that it results in the production of 2 molecules of acetic acid which must either be disposed of as a by-product or subjected to the very difficult process of reconverting the acid to acid anhydride. Direct esterification of the lactonitrile with acetic acid has been attempted. However, the water liberated during the reaction hydrolyzes the nitrile group to the corresponding acetylated amide or acid in the presence of the usual catalysts used for esterification.

The principal object of the present invention is the development of a process for the direct esterification of alpha hydroxy alkyl cyanides with organic carboxylic acids. This and other objects will be apparent to those skilled in the art upon reading the following description.

It has now been found that alpha hydroxy alkyl cyanides can be reacted with organic carboxylic acid to form the alpha hydroxy alkyl cyanide esters if the reaction is conducted in the presence of an organic sulfonic acid catalyst and an entrainer for removing water from the sphere of the reaction, under reflux temperature and pressure conditions to give azeotropic distillation for the particular entrainer used. The alpha hydroxy alkyl cyanides or alpha hydroxy alkane nitriles useful as starting materials in the present invention have the general formula—

RR'C(OH)CN wherein R is an alkyl radical such as methyl, ethyl, propyl, etc. and R' is hydrogen or an alkyl radical. Illustrations of these individual compounds falling within this class are lactonitrile (alpha hydroxy ethyl cyanide) and acetone cyanohydrin (alpha hydroxy isopropyl cyanide).

In the present invention the hydroxy radical of the cyanohydrin compound reacts with an organic carboxylic acid to yield an ester. This reaction may be illustrated by the following equation—

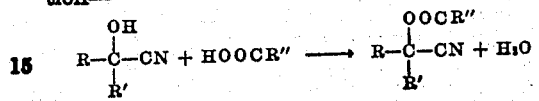

wherein R is an alkyl radical; R' and R" are hydrogen or an alkyl radical.

Suitable acids for esterifying the OH radical of the cyanohydrin are such esters as acetic, propionic, benzoic, stearic, oxalic acids. The reaction is promoted by the use of an organic sulfonic acid as the catalyst for which purpose benzene sulfonic acid and paratoluene sulfonic acid are preferred, for the reasons that the organic sulfonic acids, it has been found, promote esterification while inhibiting nitrile hydrolysis.

In carrying out the reaction, the reactants are placed in the reactor equipped with a reflux condenser. To this mixture in the reaction there is then added an entraining fluid capable of forming an azeotrope with water and small amounts of catalyst. The materials are then heated slightly above the boiling point of the entrainer until the reaction is complete as shown by the absence of water in the condensed entraining fluid. Since the esterifying acid, water and entrainer form a ternary agent, due consideration to this fact must be given when mixing the reactants, provision being made for sufficient excess esterifying acid over and above that required for esterification to permit the formation of the azeotropes. Generally from 1½ to 2½ mols of esterifying acid per mol of cyanohydrin will be found to be sufficient. A relatively inert material capable of forming an azeotrope with water, said azeotrope having a boiling point below the boiling point of either the esterifying acid or cyanohydrin may be used to remove the water formed from the sphere of the reaction. For this purpose normal propyl acetate, methyl normal propyl ketone, benzene or toluene have been found to be quite suitable, toluene being preferred. The amount of entrainer used is governed by the amount of water required to be removed from the reaction zone and as long as there is sufficient entrainer present in the system to form the azeotrope any excess is superficial but not detrimental. The entrainer may be recycled after separation from the water removed from the reaction zone. Care must be exercised in the use of the catalyst, which should not exceed 0.5% by weight calculated on the basis of pure sulfonic acid and reactants charged to the reactor. Usually the catalyst will be present in the range from 0.1% to 0.5% by weight with about 0.3% by weight being preferred. As the reaction proceeds a constant boiling mixture of entrainer and water or entrainer, water and esterifying acid is taken overhead, condensed, and after the water, which settles as a lower layer in the condensation, is removed, the entrainer or entrainer and acid is returned to the reaction zone.

The results of several actual runs given in tabulated form below will serve to further illustrate the principles of the invention.

TABLE I

*Direct esterification of lactonitrile to lactonitrile acetate*

| | Run | | | | | |
|---|---|---|---|---|---|---|
| | A | B | C | D | E | F |
| Entrainer used | (1) | (1) | (1) | (1) | (1) | (2) |
| Catalyst | (3) | 96% $H_2SO_4$ | (4) | (3) | (3) | (3) |
| Catalyst concentration, equivalents | 0.0263 | 0.026 | 0.026 | 0.053 | 0.0053 | 0.026 |
| Entrainer ... moles | 1.75 | 1.63 | 1.75 | 1.75 | 1.75 | 0.34 |
| Acetic acid ... do | 2.02 | 2.02 | 2.00 | 2.00 | 2.00 | 4.41 |
| Lactonitrile ... do | 0.695 | 0.695 | 0.686 | 0.693 | 0.692 | 0.680 |
| Reaction time ... minutes | 399 | 328 | 459 | 425 | 3110 | 210 |
| Reaction temperature ... °C | 110-112 | 110-112 | 110-112 | 110-112 | 110-112 | 112-114 |
| Reaction products: | | | | | | |
| Water overhead ... moles | 0.638 | 0.333 | 0.569 | 0.594 | 0.461 | 0.483 |
| Acetic acid ... do | 1.46 | 1.63 | 1.395 | 1.375 | | 3.59 |
| Lactonitrile acetate, moles (B. P. 78-82° C./30 mm.) | 0.547 | 0.268 | 0.517 | 0.556 | 0.460 | 0.497 |
| Lactonitrile, moles (B. P. 94-100° C./30 mm.) | 0.097 | 0.138 | 0.099 | 0.121 | 0.187 | 0 |
| Polymer ... grams | | 22.6 | 2.0 | 8.0 | | 5 |
| Residue ... do | 16.6 | 8.7 | 24.7 | 30.7 | 21.2 | 21.8 |
| Yield of lactonitrile acetate ... mole per cent | 79 | 39 | 75.3 | 80.2 | 66.5 | 71.6 |
| Conversion of lactonitrile ... do | 86 | 80 | 85.6 | 82.5 | 73.0 | 100 |
| Selective ... per cent | 92 | 48 | 88 | 97 | 91 | 71.6 |
| Percent recovery: Entrainer | 74.0 | 92.3 | 90.3 | 89 | 95 | 100 |

1 Redistilled methyl n-propyl ketone B. P. 102-103° C.
2 Toluene.
3 p-Toluene sulfonic acid monohydrate.
4 Crude benzene sulfonic acid (65%) was treated with lime to destroy free sulfuric acid.
5 Includes catalyst as calcium salt, calcium acetate as polymeric material not distillable.

It should be noted from the foregoing that sulfuric acid is not an effective catalyst for this reaction as shown by the high polymers produced as well as the low yield and low selectivity. It should also be noted as shown in the runs that too low a concentration of catalyst results in a low yield even though an abnormally long reaction time is given. The products obtained by the present invention can be pyrolyzed to vinyl type nitriles which are useful in the production of synthetic rubber-like polymers.

What is claimed is:

1. A method for producing esters of alpha hydroxy alkyl cyanide which consists in reacting alpha hydroxy alkyl cyanide with an organic carboxylic acid, selected from the group consisting of mono and dibasic organic carboxylic acids, in the presence of para toluene sulfonic acid in an entrainer under reflux conditions, said entrainer selected from the group consisting of normal propyl acetate, methyl normal propyl ketone, benzene and toluene.

2. A method for producing esters of alpha hydroxy alkyl cyanides which consists in reacting alpha hydroxy alkyl cyanides with an organic carboxylic acid, selected from the group consisting of mono and dibasic organic carboxylic acids, in the presence of benzene sulfonic acid in an entrainer under reflux conditions, said entrainer selected from the group consisting of normal propyl acetate, methyl normal propyl ketone, benzene and toluene.

3. A method for producing esters of alpha hydroxy alkyl cyanides which consists in reacting a hydroxy alkyl cyanide with an organic carboxylic acid, selected from the group consisting of mono and dibasic organic carboxylic acids, in the presence of para toluene sulfonic acid in methyl n-propyl ketone under reflux conditions, said entrainer selected from the group consisting of normal propyl acetate, methyl normal propyl ketone, benzene and toluene.

4. A method for producing esters of lactonitrile which consists in reacting lactonitrile with an organic carboxylic acid, selected from the group consisting of mono and dibasic organic carboxylic acids, in the presence of an organic sulfonic acid in an entrainer under reflux conditions, said entrainer selected from the group consisting of normal propyl acetate, methyl normal propyl ketone, benzene and toluene.

5. A method for producing esters of lactonitrile which consists in reacting lactonitrile with an organic mono-carboxylic acid, selected from the group consisting of mono and dibasic organic carboxylic acids, in the presence of organic sulfonic acid in an entrainer under reflux conditions.

6. A method for producing esters of lactonitrile which consists in reacting lactonitrile with an organic monocarboxylic acid, selected from the group consisting of mono and dibasic organic carboxylic acids, in the presence of para toluene sulfonic acid in toluene under reflux conditions.

7. A method for producing lactonitrile acetate which consists in reacting lactonitrile with acetic acid in the presence of benzene sulfonic acid in toluene under reflux conditions.

8. A method for producing esters of alpha-hydroxy alkyl cyanides which consists in reacting an alpha-hydroxy alkane nitrile having the formula

RR'C(OH)CN wherein R is an alkyl radical; R' is a substituent selected from the group consisting of hydrogen atoms and alkyl radicals, with an organic carboxylic acid selected from the group consisting of mono and dibasic organic carboxylic acids, in the presence of an aromatic sulfonic acid in an entrainer under reflux conditions, said entrainer being selected from the group consisting of normal propyl acetate, methyl normal propyl ketone, benzene and toluene.

9. A method for producing acetone cyanohydrin acetate which consists in reacting alpha-hydroxy isopropyl cyanide with acetic acid in the presence of benzene sulfonic acid in toluene under reflux conditions.

OBER C. SLOTTERBECK.